May 21, 1935. A. G. WOODMAN 2,001,997
HONEY EXTRACTOR CONSTRUCTION
Filed April 3, 1933  3 Sheets-Sheet 1
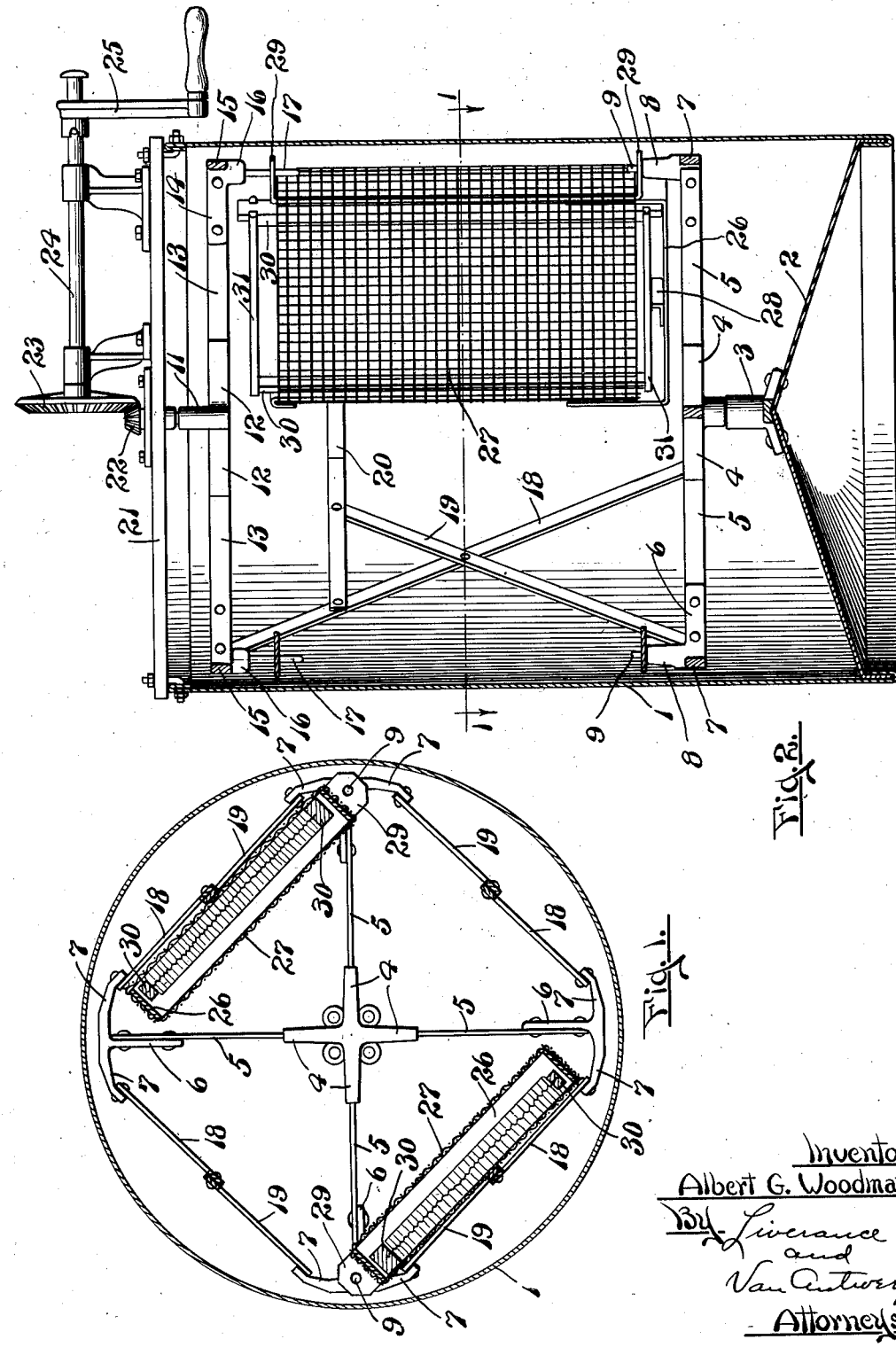
Inventor
Albert G. Woodman
By Liverance
and
Van Antwerp
Attorneys May 21, 1935. A. G. WOODMAN 2,001,997
HONEY EXTRACTOR CONSTRUCTION
Filed April 3, 1933 3 Sheets-Sheet 2
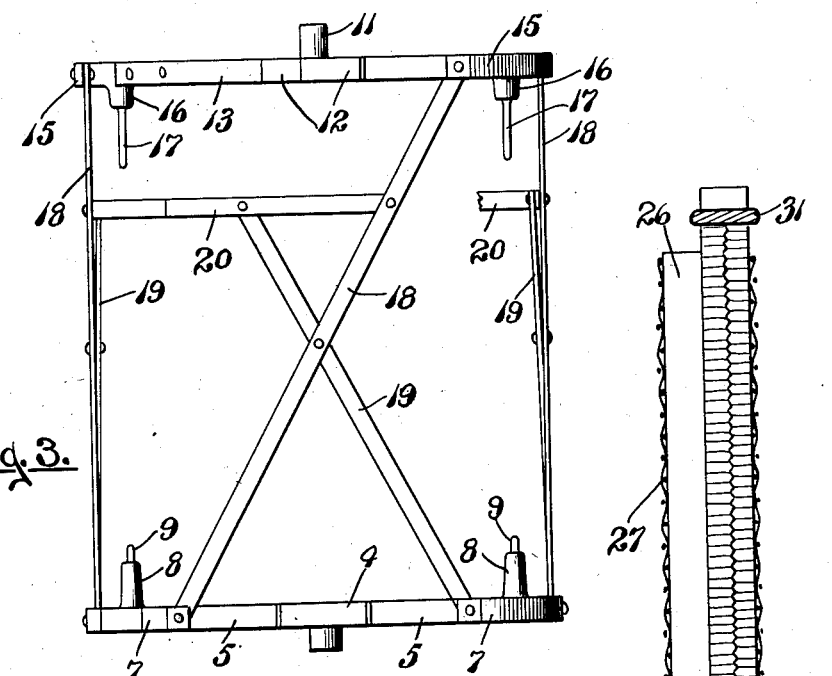
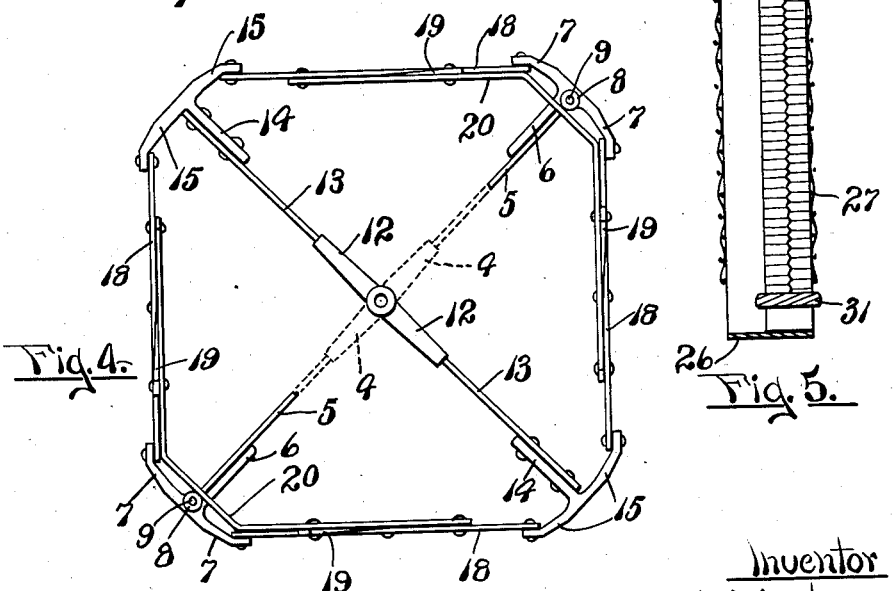
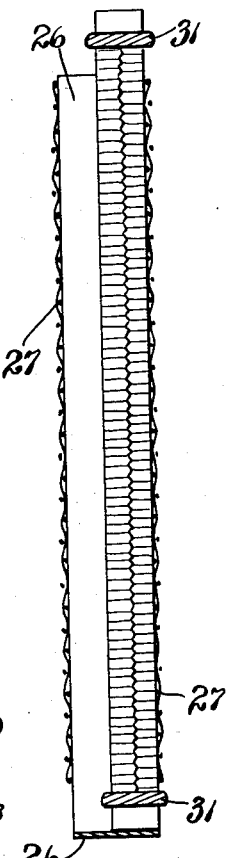
Inventor
Albert G. Woodman
By Liverance and Van Antwerp
Attorneys May 21, 1935.  A. G. WOODMAN  2,001,997

HONEY EXTRACTOR CONSTRUCTION

Filed April 3, 1933  3 Sheets-Sheet 3

Inventor
Albert G. Woodman
By Liverance and
Van Antwerp
Attorneys

Patented May 21, 1935

2,001,997

UNITED STATES PATENT OFFICE 2,001,997

HONEY EXTRACTOR CONSTRUCTION

Albert G. Woodman, Grand Rapids, Mich.

Application April 3, 1933, Serial No. 664,090

5 Claims. (Cl. 210—65)

This invention relates to a honey extractor, wherein honey is extracted from a honeycomb in a revolving extracting mechanism, the principle of centrifugal action being availed of so that the honey, being in liquid form, is thrown outwardly against the inner sides of an enclosing receptacle and separated from the comb, which honey with the frame in which it is located, being held in a foraminous retainer therefor which is carried by the rotating mechanism.

It is a primary object of the present invention to provide a very practical, serviceable and especially compact construction of a honey extractor which is durable and efficient in service, readily maintained in a clean and sanitary condition and with which the honey can be extracted from both sides of the comb by swinging the holder for the honey frame to two different positions which the construction readily permits.

An understanding of the invention may be had from the following description, taken in connection with the accompanying drawings, in which, Fig. 1 is a transverse section substantially on the plane of line 1—1 of Fig. 2.

Fig. 2 is a central vertical section through the honey extractor of my invention Fig. 3 is a side elevation of the inner revolving cage.

Fig. 4 is a plan view thereof.

Fig. 5 is an enlarged section through one of the foraminous holders for the frames which carry the honey in combs.

Like reference characters refer to like parts in the different figures of the drawings.

Figure 6:
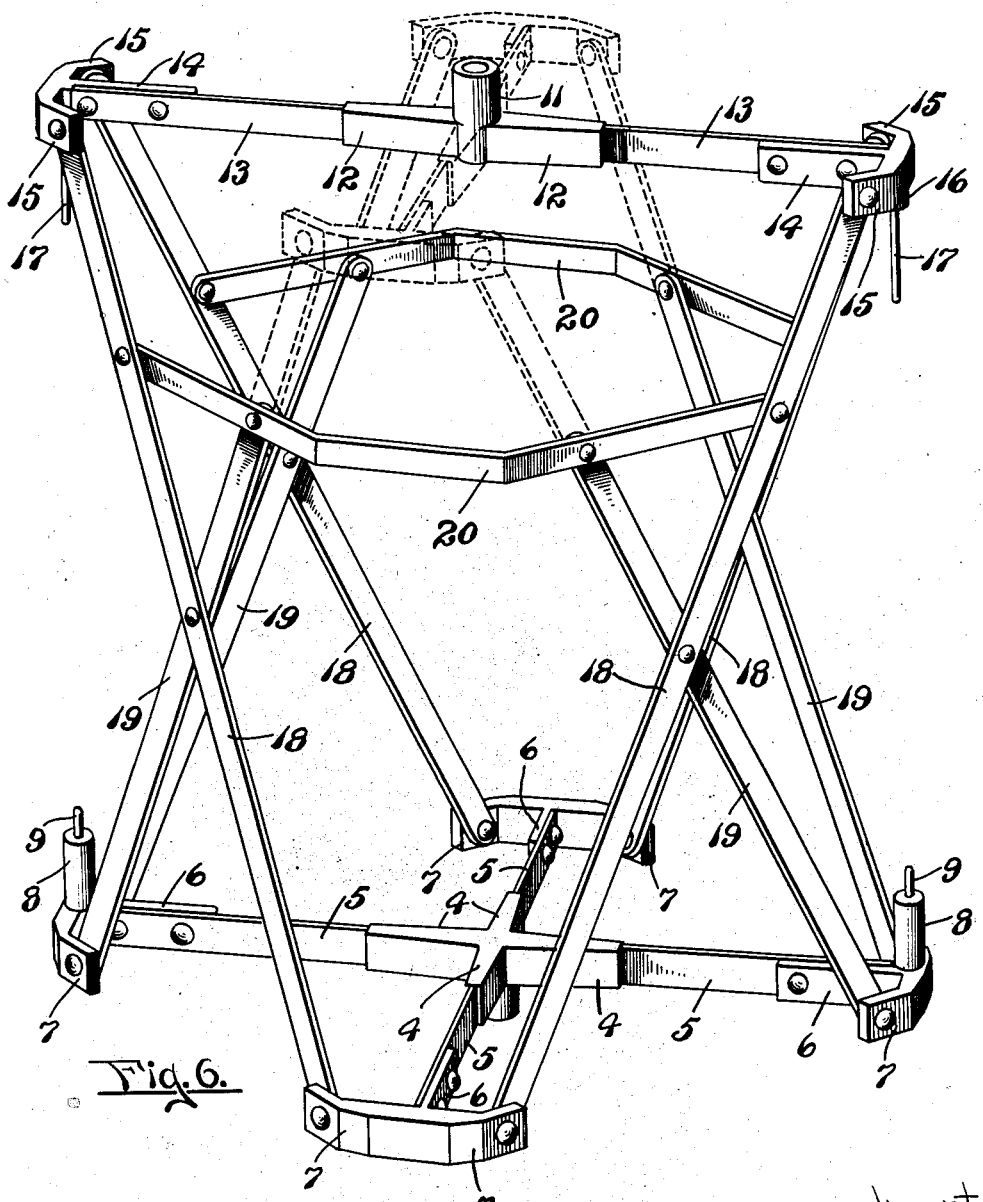
Fig. 6 is a perspective view of the revolving cage.

In the construction, an outer receptacle of sheet metal, preferably, is used having vertical walls 1 and a bottom 2 which is of a conical form, and the receptacle is of cylindrical form. At the apex of the conical bottom 2 a support 3 is permanently secured. On this support the rotating cage of the extractor is mounted at its lower end for rotation.

Said rotatable cage includes a lower member having a central spider from which a plurality of arms 4 extend radially outward, four arms being shown, to each of which a bar 5 is connected and at the outer end of each of the bars 5 a casting is secured. This casting includes an inwardly extending arm 6, to which the outer end portion of bar 5 is riveted or otherwise permanently secured, and from the outer end of the arm 6 two fingers 7 extend laterally and approximate in the shape of an arc of a circle of a radius less than the radius of the cylindrical wall 1 of the receptacle, this permitting the same to come closely adjacent the inner sides of the walls 1 of the receptacle as shown in Fig. 1. Each of the castings thus described may also have an upwardly extending post 8 at the outer end of the arm 6 from which a short pin 9 extends upwardly, or certain of the castings may be made without such posts. In the drawings the castings at the four corners of the rotating cage are alternately with and without the posts 8, two opposite each other being without said posts 8 and the others being provided therewith.

The upper member of the rotating cage is of very similar construction. It has a central spider from which a sleeve 11 extends upwardly in axial alinement with the axis of the lower spider and of the lower support 3. From it a plurality of arms 12 extend radially outward, two being shown, to each of which a bar 13 is secured at one end; and at the outer end of each bar an upper casting member is secured very similar to the lower members of cast iron which are secured to the outer ends of the bars 5. That is, each has an inwardly extending arm 14 to connect the same to the outer ends of the bars 13, and laterally extended fingers 15, similarly shaped to the fingers 7, a downwardly extending post 16 shorter than the post 8, from each of which a pin 17 projects downwardly considerably longer than the pins 9 but located directly above and in vertical axial alinement therewith. The cage is completed by bars 18, 19 and 20. The bars 18 extend diagonally from one of the arms 15 of the upper casting to an arm 7 of a lower casting with shorter bars 19 crossing the same connected at their lower ends to arms 7 of the lower castings; and with the bars 19 shorter than the bars 18 being connected thereto at their crossing points and also by horizontal bars 20 bent angularly as shown in Fig. 4, which serve as stop bars to prevent outward swinging of the foraminous holders hereafter described.

The receptacle at its upper end is provided with a detachable bar 21 extending across the diameter of the receptacle, centrally of which is a short driving shaft adapted to fit at its lower end in the upper end of the sleeve 11, and at its upper end equipped with a beveled pinion 22. This pinion 22 is driven by a beveled gear 23 on a shaft 24 which is manually turned by a crank 25, as shown, to rotate the interior cage at high speed.

The upper and lower pairs of pins 9 and 17 are adapted to have foraminous holders for honey frames mounted thereon. Each of said holders comprises an open frame 26 of flat metal having vertical sides and horizontal ends surrounding which is a screen 27. The lower edge of the screen is located a short distance above the lower side of the frame 26 and the lower side of said frame 26 carries a spacing member 28 for the comb carrying frame to rest upon; and as will later appear the upper end of the comb carrying frame extends a short distance above the upper edge of the screen or other foraminous material 27. From the frame 26 at one vertical side thereof lateral ears 29 of sheet metal extend, spaced apart from each other, through which the pins 9 and 17 pass whereby the holder for the comb carrying frames are pivotally mounted to turn about the pins 9 and 17.

The honey carrying frames are of rectangular shape, having spaced apart vertical sides 30 and spaced apart horizontal ends 31. The width of the end members is slightly greater than of the sides 30 and 31, but in any case when the comb and honey carrying frame is located within a holder, as shown in Fig. 5, the upper and lower ends 31 of the frame do not come against the screen 27 but come above and below it so that the comb within the frame is brought directly against the screen in the rotation of the mechanism, serving to protect and hold the comb from breaking during the extracting.

In operation, the combs of honey are placed in their respective holders, the caps or outer ends of the combs being cut away, and then the holders are inserted onto the revolving frame by first lowering the holder and then raising the holder so that the upper bracket member 29 is slid onto the depending pin 17 and then lowering the holder member so that the lower bracket member 29 is next received onto the pins 9, this giving a pivotal mounting of the holder member.

The handle member 25 is now rotated in either direction and this first causes the holder member to swing outwardly against the bars 18, 19 and 20, and then, upon increase of the speed of rotation all honey on the outer side of the comb is thrown outwardly through centrifugal force against the inner side of the container 1.

After the honey has been extracted from one side of the combs, the holders are rotated about their pivotal points so as to bring the opposite side of the comb outwardly against the bars. During the extraction of the honey it is to be noted that the body of the comb lies snugly and firmly against the screen member 27, such being possible due to the screen member 27 being cut away so that the sides 31 of the frame are free to move outwardly and hence do not hinder the above contact between the main portion of the comb of honey and the screen, such preventing the breaking of the comb with its attendant disadvantages.

The construction is particularly practical and useful. With it all of the available space within the container 1 may be utilized or, conversely, the container may be reduced in diameter to a minimum for standard sizes of honey frames and holders therefor. The holders may be readily removed for cleaning or for subjecting them to any sanitary process which may be necessary at times.

The invention may be embodied in other forms of structure, one of which additions is indicated in dotted lines in Fig. 6. That is, the bars 19 may be extended to be of the same length as the bars 18, and additional arms 12 applied to the upper head of the spider at right angles to those shown in Fig. 6, to which bars 13 may be secured, the same terminating in castings having the fingers 15, the extensions to bars 19 being secured thereto. This dotted line indication shown in Fig. 6 may be further modified so as to provide the castings at the ends of the bars 5 and at the ends of the additional bars 13 with pins 9 and 17 to mount additional holders so that four may be used instead of two, as shown in Fig. 1. This is in accordance with the same principles of construction with very little additional material used.

The invention accordingly is to be considered comprehensive of all forms of structure defined in the claims and not to be limited strictly to the specific structure shown and described.

I claim:

1. In a honey extractor of the character described, the combination of, a cylindrical receptacle of sheet metal having a bottom of conical form, a support secured at the apex of the conical bottom, and a cage revolubly mounted upon said support, said cage consisting of, a central spider member having a plurality of arms extending radially outward therefrom, said spider being pivotally mounted upon said support, arms rigidly fastened to the first mentioned arms and extending outwardly in prolongation therewith, a casting member secured to each of said second mentioned arms, said casting member having oppositely extending fingers, said fingers being horizontally located and extending in the arc of a circle, a bar member fastened across the top of the receptacle, a spider rotatably connected to said bar member and bars fastened to said spider and extending radially therefrom, casting members fastened to each of said bars, said last mentioned casting members having oppositely extending arms thereon, reinforcing bars extending from each arm of each of said last mentioned casting members diagonally downwardly to the first mentioned casting member laterally positioned therefrom, additional reinforcing bars fastened to the arms of the first mentioned casting member and extending upwardly and crossing the first mentioned reinforcing bars and being fastened thereto, said last mentioned reinforcing bars terminating short of the horizontal plane in which the second mentioned spider is located, a horizontally extending reinforcing bar extending between the upper end of the shorter diagonal reinforcing bars and then continuing to and fastened to the longer diagonal reinforcing bars, holders pivotally mounted between the second mentioned casting members and the first mentioned casting members which are located directly therebelow, said holders being adapted to receive frames of comb honey, and means to rotate the said cage.

2. In combination, a cylindrical receptacle, a cage revolubly mounted therein, means to rotate said cage, said cage consisting of, a lower spider having four radially extending arms, an upper spider having two radially extending arms, casting members mounted upon said arms, the casting members on the arms of the upper spider being vertically alined with the casting members on the arms of the lower spider the vertically alined casting members having alined pins thereon, a holding member pivotally supported upon said pins whereby it may be rotated thereon interiorly of said cage and means to prevent outward swinging of the holding member in either direction.

3. In a device of the class described, a holder comprising an upwardly extending U-shaped frame having a cover of foraminous material extending around the outer side of the arms of the U-shaped frame and leaving the top uncovered and terminating short of the bottom of the U-shaped member, said holder adapted to receive a frame of comb honey, the members of the frame of honey being free to extend outwardly at either end of the foraminous cover for the purpose described.

4. In combination, a cylindrical receptacle, a cage revolubly mounted therein, means to rotate the cage, said cage consisting of, an upper and lower spider having radially extending arms, the arms on the upper spider being in vertical alinement with arms of the lower spider, reinforcing bars fastened to each arm of the upper spider and extending diagonally downward to each arm of the lower spider laterally positioned therefrom, horizontal reinforcing bars extending around the cage and fastened to the first mentioned reinforcing bars in a plane below the upper spider, vertically alined pins on each of the arms of the upper and lower spiders, holders pivotally mounted between the vertically alined pins, said reinforcing bars preventing outward swinging movement of the holders.

5. In a honey extractor of the character described, a combination of a cylindrical receptacle having a bottom, a support secured at the center of the bottom thereof and a cage located within the said receptacle, said cage comprising a central spider member, said spider being pivotally mounted upon said support, arms rigid with the spider and extending outwardly therefrom, a first means located at the outer ends of each of the said arms, this first means having oppositely extending fingers, said fingers being substantially horizontally located and extending in the arc of a circle, a bar member fastened across the top of the receptacle, a spider rotatably connected to said bar member, additional bars fastened to said last mentioned spider and extending outwardly therefrom, a second means fastened to each of said last mentioned bars, said second means having oppositely extending fingers thereon, reinforcing bars extending from each finger of said last mentioned means diagonally downward to the first mentioned means which is laterally positioned therefrom, additional reinforcing bars fastened to the fingers of the first mtntioned means and extending upwardly and crossing the first mentioned reinforcing bars and being fastened thereto, a horizontally extending reinforcing bar extending between the two diagonal reinforcing bars above their crossing and fastened thereto and holders pivotally mounted between the second mentioned means and the first mentioned means which are located therebelow, said holders being adapted to receive frames of comb honey.

ALBERT G. WOODMAN.